(12) United States Patent
Chapman et al.

(10) Patent No.: US 9,266,075 B2
(45) Date of Patent: Feb. 23, 2016

(54) DOSER AND MIXER FOR A VEHICLE EXHAUST SYSTEM

(71) Applicant: Faurecia Emissions Control Technologies, USA, LLC, Columbus, IN (US)

(72) Inventors: Chris Chapman, Columbus, IN (US); Eduardo Alano, Columbus, IN (US); Philippe Nappez, Mathay (FR); Eric Ottaviani, Beaucourt (FR)

(73) Assignee: Faurecia Emissions Control Technologies USA, LLC, Columbus, IN (US)

(*) Notice: Subject to any disclaimer, the term of this patent is extended or adjusted under 35 U.S.C. 154(b) by 0 days.

(21) Appl. No.: 14/431,064

(22) PCT Filed: Sep. 28, 2012

(86) PCT No.: PCT/US2012/057886
§ 371 (c)(1),
(2) Date: Mar. 25, 2015

(87) PCT Pub. No.: WO2014/051617
PCT Pub. Date: Apr. 3, 2014

(65) Prior Publication Data
US 2015/0273411 A1     Oct. 1, 2015

(51) Int. Cl.
*F01N 3/24* (2006.01)
*B01F 5/04* (2006.01)
(Continued)

(52) U.S. Cl.
CPC ........... *B01F 5/0471* (2013.01); *B01F 3/04049* (2013.01); *B01F 5/0057* (2013.01); *F01N 3/2066* (2013.01); *F01N 3/2892* (2013.01); *B01F 5/0478* (2013.01); *B01F 5/0604* (2013.01); *B01F 5/0615* (2013.01); *B01F 2005/0639* (2013.01); *B01F 2215/0085* (2013.01); *B01F 2215/0431* (2013.01); *F01N 1/083* (2013.01); *F01N 1/087* (2013.01); *F01N 1/088* (2013.01);
(Continued)

(58) Field of Classification Search
CPC ......... F01N 1/083; F01N 1/086; F01N 1/087; F01N 1/088; F01N 3/208; F01N 3/2892; F01N 2240/20; F01N 2610/02; F01N 2610/1453; B01F 5/0057; B01F 5/0471; B01F 5/0478; B01F 5/0604; B01F 5/0615; B01F 2005/0639; B01F 2215/0085; B01F 2215/0431
USPC ............................ 60/295, 301, 310, 317, 324
See application file for complete search history.

(56) References Cited

U.S. PATENT DOCUMENTS

| | | | |
|---|---|---|---|
| 2008/0141667 A1 | 6/2008 | Winter et al. | |
| 2011/0167810 A1 | 7/2011 | Lebas et al. | |
| 2012/0216513 A1* | 8/2012 | Greber | F01N 3/2066 60/295 |

FOREIGN PATENT DOCUMENTS

| | | | |
|---|---|---|---|
| JP | 2004339991 A | | 12/2004 |
| KR | 10-2011-0049152 A | | 5/2011 |
| KR | 20110049152 A | * | 5/2011 |

*Primary Examiner* — Thomas Denion
*Assistant Examiner* — Jorge Leon, Jr.
(74) *Attorney, Agent, or Firm* — Carlson, Gaskey & Olds (57) ABSTRACT

A vehicle exhaust system includes a mixer and a doser that sprays a reducing agent into the mixer to be thoroughly mixed with engine exhaust gases prior to introduction of the mixture into a downstream exhaust component. The doser is mounted in a tangential orientation relative to a point defined at an intersection of a doser axis with a theoretical cylinder that surrounds a center axis of the mixer and is defined by a variable radius.

9 Claims, 7 Drawing Sheets

(51) Int. Cl.
*F01N 3/20* (2006.01)
*F01N 3/28* (2006.01)
*B01F 5/00* (2006.01)
*B01F 3/04* (2006.01)
*F01N 1/08* (2006.01)
*B01F 5/06* (2006.01)

(52) U.S. Cl.
CPC ........ *F01N 2240/20* (2013.01); *F01N 2610/02* (2013.01); *F01N 2610/1453* (2013.01); *Y02T 10/24* (2013.01)

FIG.12

DOSER AND MIXER FOR A VEHICLE EXHAUST SYSTEM

BACKGROUND OF THE INVENTION

An exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products of urea transformation.

The doser typically sprays the urea into the exhaust stream. In one known configuration, the doser is mounted to an outer peripheral surface of the mixer and is configured to direct the spray radially inwardly toward a center of the mixer. This configuration has the disadvantage of increased urea deposit formation.

SUMMARY OF THE INVENTION

In one exemplary embodiment, a vehicle exhaust system includes a mixer and a doser that sprays a reducing agent into the mixer to be thoroughly mixed with engine exhaust gases prior to introduction of the mixture into a downstream exhaust component. The doser is mounted in a tangential orientation.

In a further embodiment of the above, the mixer defines a center axis extending along a length of the mixer and the doser defines a central doser axis that is tangentially oriented relative to a point at an intersection of the doser axis with a theoretical cylinder that surrounds the center axis and is defined by a variable radius.

In a further embodiment of any of the above, the mixer includes an upstream baffle adjacent the inlet end and downstream baffle adjacent the outlet end. The upstream baffle includes a plurality of openings with one opening of the plurality of openings being larger than the remaining openings such that a substantial portion of the engine exhaust gases flow through the one opening. The doser is positioned upstream of and adjacent to the one opening.

In a further embodiment of any of the above, the one opening is defined by an inner peripheral edge and an outer peripheral edge spaced radially outwardly of the inner peripheral edge, and wherein the central doser axis extends in a direction generally parallel to a line tangential to an outer peripheral surface of the mixer.

In a further embodiment of any of the above, wherein the central doser axis is closer to the outer peripheral edge than the inner peripheral edge.

In another exemplary embodiment, a vehicle exhaust system includes a first exhaust component having an inlet to receive engine exhaust gases, a second exhaust component positioned downstream of the first exhaust component, and a mixer positioned downstream of the first exhaust component and upstream of the second exhaust component. The mixer has an inlet end configured to receive engine exhaust gases exiting the first exhaust component and an outlet end to direct swirling engine exhaust gas to the second exhaust component. The mixer has an upstream baffle adjacent the inlet end and a downstream baffle adjacent the downstream end, with the upstream baffle including a baffle opening through which a majority of the engine exhaust gases flow into the mixer. A doser sprays a reducing agent into the mixer, wherein the doser is mounted to an outer peripheral surface of the mixer upstream of the baffle opening. The doser defines a central doser axis that is tangentially orientated relative to a point at an intersection of the doser axis with a theoretical cylinder that surrounds the center axis and is defined by a variable radius.

These and other features of this application will be best understood from the following specification and drawings, the following of which is a brief description.

DETAILED DESCRIPTION

Figure 1:
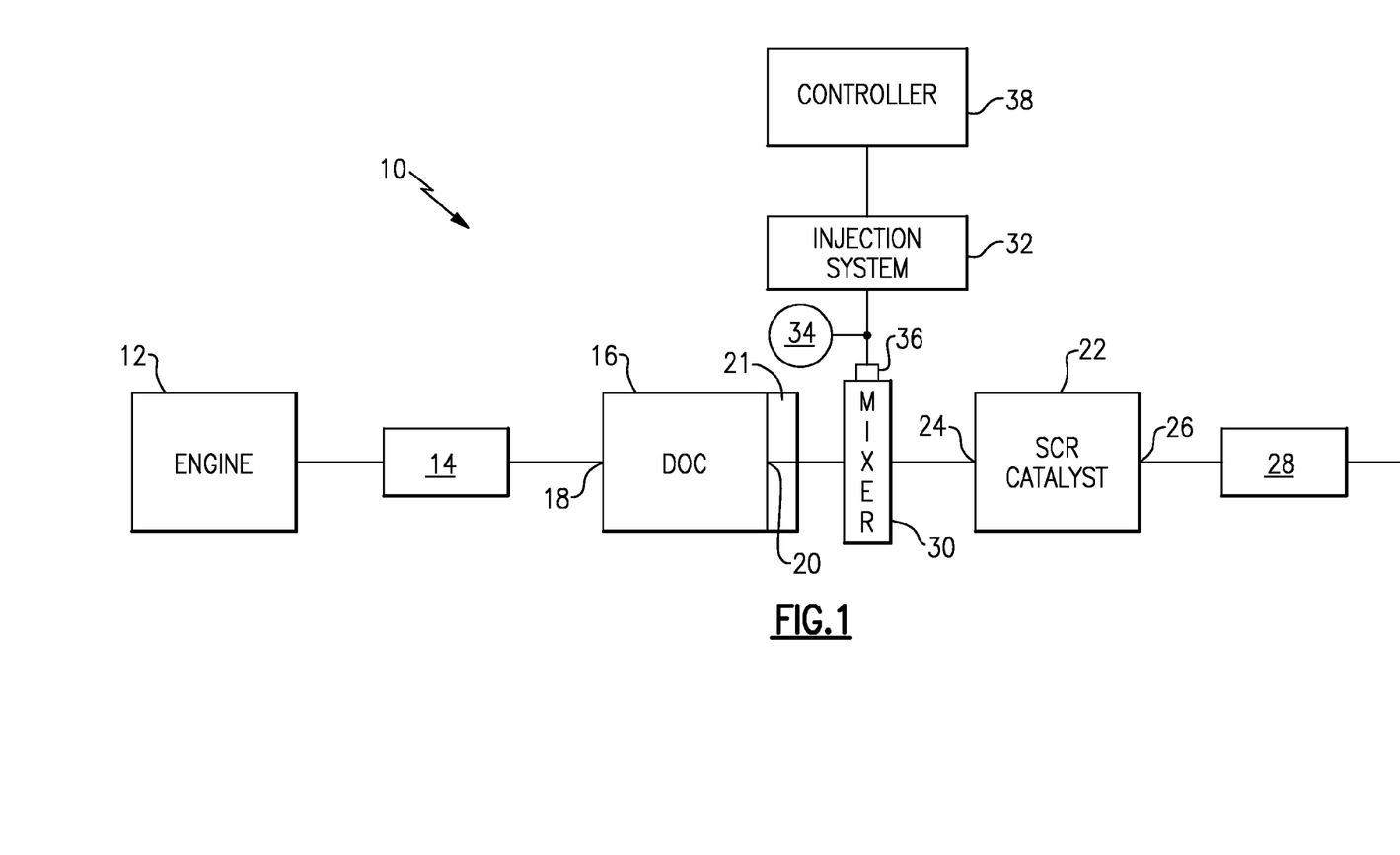
FIG. 1 schematically illustrates one example of an exhaust system with a mixer according to the subject invention.
Figure 2:
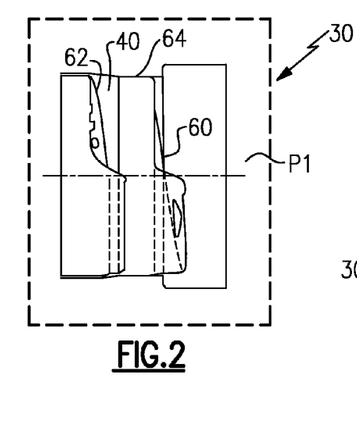
FIG. 2 is a side view in partial section of the mixer of FIG. 1.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc. In one example, configuration, the upstream exhaust components 14 direct exhaust gases into a diesel oxidation catalyst (DOC) 16 having an inlet 18 and an outlet 20. Downstream of the DOC 16 there may be a diesel particulate filter (DPF) 21 that is used to remove contaminants from the exhaust gas as known. Downstream of the DOC 16 and optional DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 or DPF 21 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, a doser 36, and a controller 38 that controls injection of the urea as known.

The mixer 30 is shown in greater detail in FIGS. 2-5. The mixer 30 comprises a mixer body having an inlet end 42 (FIG. 3) configured to receive the engine exhaust gases and an outlet end 44 (FIG. 4) to direct a mixture of swirling engine exhaust gas and products transformed from urea to the SCR catalyst 22.

Figure 3:
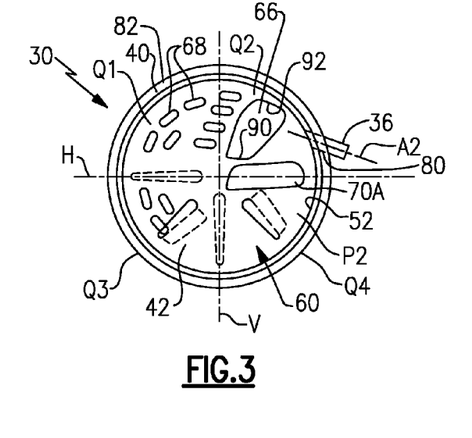
FIG. 3 is an inlet end view of the mixer of FIG. 2.
Figure 4:
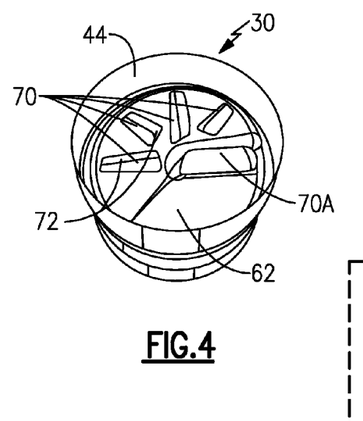
FIG. 4 is a perspective outlet end view of the mixer of FIG. 2.
Figure 5:
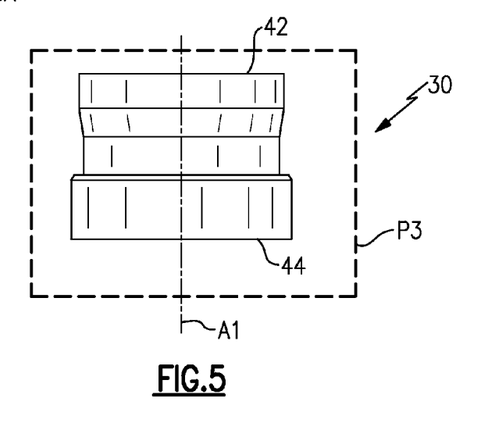
FIG. 5 is a top view of the mixer of FIG. 2.

As shown in FIGS. 3-5, the mixer body includes an upstream baffle 60 and a downstream baffle 62 that are surrounded by an outer peripheral surface 64. The upstream baffle is configured to initiate swirling of the exhaust gas flow. The mixer also includes an inner peripheral surface 52 that faces inwardly toward a center of the mixer 30. The upstream baffle 60 at the inlet end 42 includes a large opening 66 (FIG. 3) that receives the majority of the exhaust gas (receives at least 60% of the exhaust mass flow rate) and which is configured to initiate the swirling motion. The upstream baffle 60 also includes a plurality of perforations 68 that ensure optimal homogenization of exhaust gases and reduces back pressure. The downstream baffle 62 includes a plurality of openings 70 and deflector portions 72 through which the exhaust gas exits. The main exit of the mixture is through the largest opening 70A. Additional details regarding the operation of the upstream 60 and downstream baffles 62 can be found in US 2012/0216513.

The outer peripheral surface 64 of the mixer body includes a doser mount area with an opening 80 to receive the doser 36. The upstream and downstream baffles 60, 62 are spaced apart from each other in an axial direction along a length of the mixer 30. The opening 80 for the doser is positioned between the two baffles such that urea is sprayed into the swirling gas flow at a location that is upstream of the opening 66.

The mixer 30 defines a center axis A1 (FIG. 5) extending along a length of the mixer 30. The doser 36 defines a central doser axis A2 that is tangentially, i.e. non-radially, oriented relative to the center axis A1 of the mixer 30 as shown in FIG. 3. As such, the doser 36 is configured to spray the urea in a direction away from a center of the mixer 30 such that when sprayed, the urea is not directed toward the center axis A1 but is instead directed toward the inner peripheral wall of the mixer 30. Thus, the doser 36 is configured to spray the reducing agent toward the inner peripheral surface 52 such that the central doser axis A2 does not intersect the center axis A1 of the mixer.

The doser is mounted to the outer peripheral surface 64 to spray the urea through an opening 80 (FIG. 3) in the inner peripheral surface 52. The doser 36 is orientated such that the spray is directed toward an opposite wall 82 from the opening 80 along a doser path that does not intersect the center axis A1. As the spray exits the doser 36, it combines with the swirling flow of the exhaust gases such that the mixture swirls about the center axis A1.

The mixer 30 has a cross-sectional area defined by a vertical axis V in a vertical plane P1 that is perpendicular the center axis A1 and a horizontal axis H in a horizontal plane P2 that is perpendicular to both the vertical plane P1 and the center axis A1. The vertical plane P1 extends along a length of the mixer and separates the mixer into right and left halves. The center axis A1 extends along the horizontal plane P2 that separates the mixer into upper and lower halves.

The horizontal H and vertical V axes separate the cross-sectional area into four quadrants Q1, Q2, Q3, and Q4. The first Q1 and second Q2 quadrants comprise upper quadrants for an upper half of the cross-sectional area, and the third Q3 and fourth Q4 quadrants comprises lower quadrants for a lower half of the cross-sectional area. In one example, the central doser axis A2 only extends across the upper quadrants Q1, Q2. This facilitates introducing the urea more effectively into the swirling engine exhaust gases.

In one example, the doser 36 is positioned adjacent to, and upstream of, the large opening 66. The large opening 66, for example, is located within one of the upper quadrants Q1, Q2. The large opening 66 is defined by an inner peripheral edge 90 and an outer peripheral edge 92 spaced radially outwardly of the inner peripheral edge 90. In one example, the central doser axis A2 extends in a direction generally parallel to a line tangential to the outer peripheral surface 64.

In one example, the central doser axis A2 is closer to the outer peripheral edge 92 than the inner peripheral edge 90.

Figure 6:
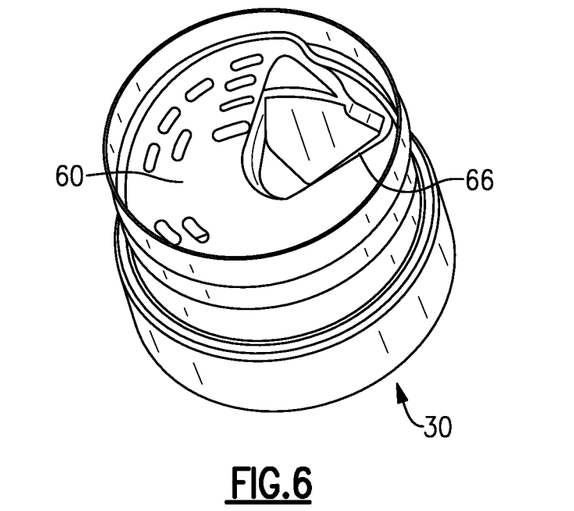
FIG. 6 is a perspective view of the mixer.
Figure 7:
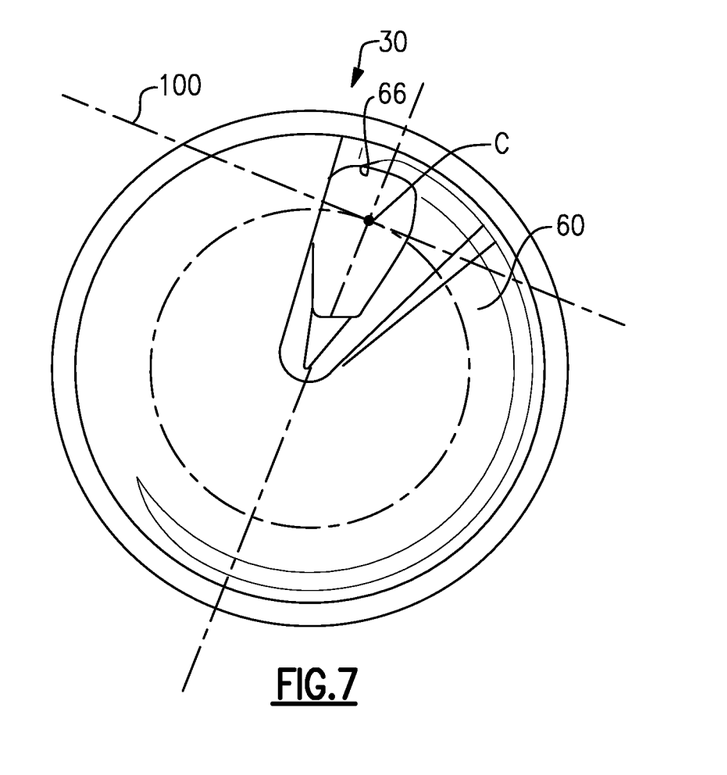
FIG. 7 is an end view of the mixer.
Figure 8:
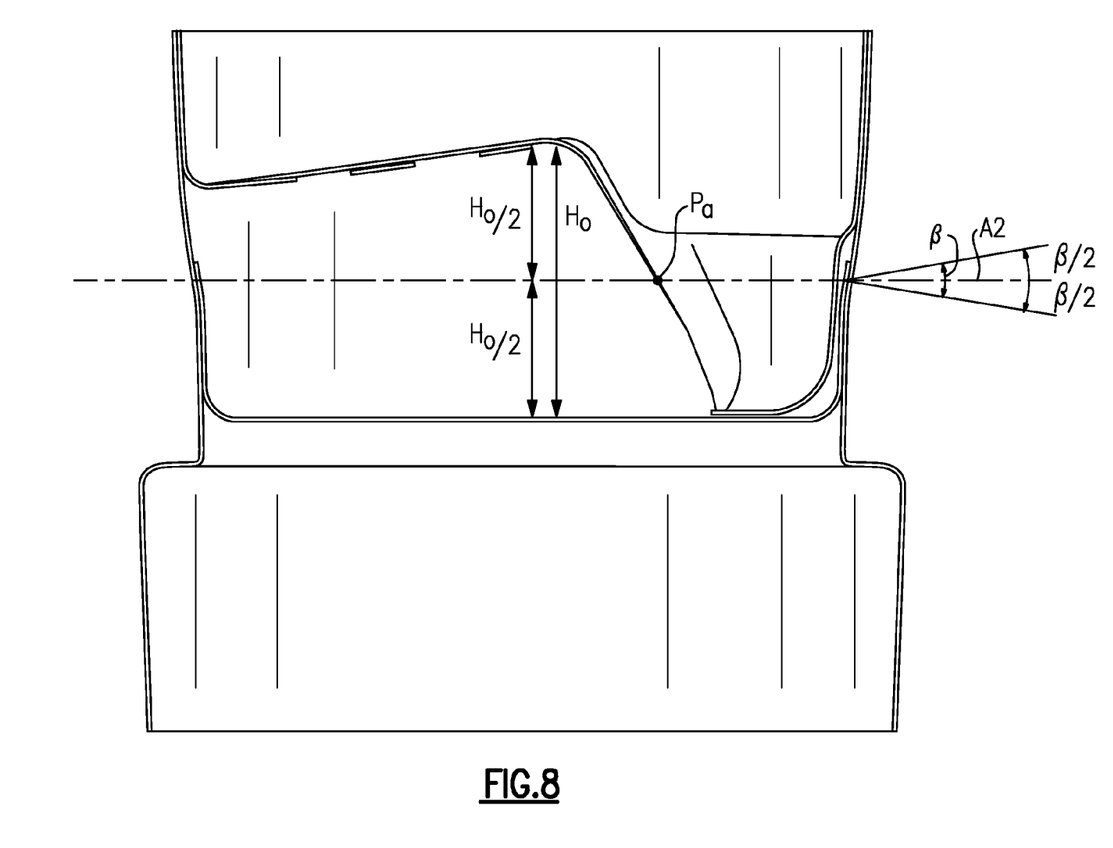
FIG. 8 is a section view of the mixer.
Figure 9:
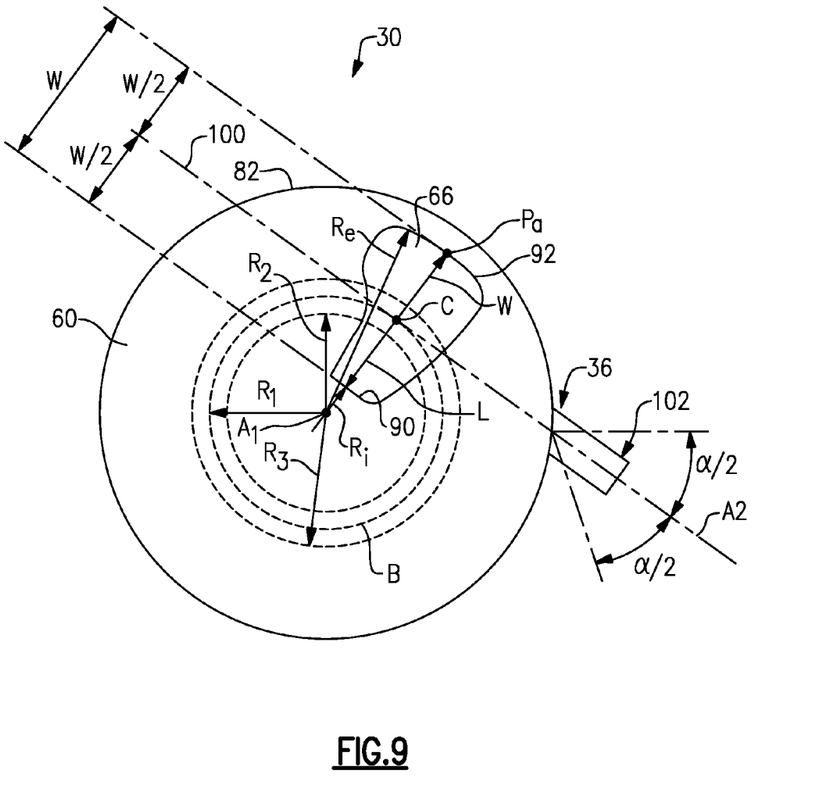
FIG. 9 is a schematic representation of a range of doser positions.

FIG. 6 shows a perspective view of the mixer 30 as viewed from the inlet end 42. The large opening 66 is defined by a maximum opening width W (FIG. 9) and a maximum opening height Ho (FIG. 8). The opening 66 has point C. A radius R1 is variable anywhere from inner radius R2 to outer radius R3 to define a range of theoretical cylinders surrounding axis A1. As shown in FIG. 9, the maximum opening width W has an innermost peripheral edge at Ri and an outermost peripheral edge at Re. The width W=Re−Ri.

Figure 10:
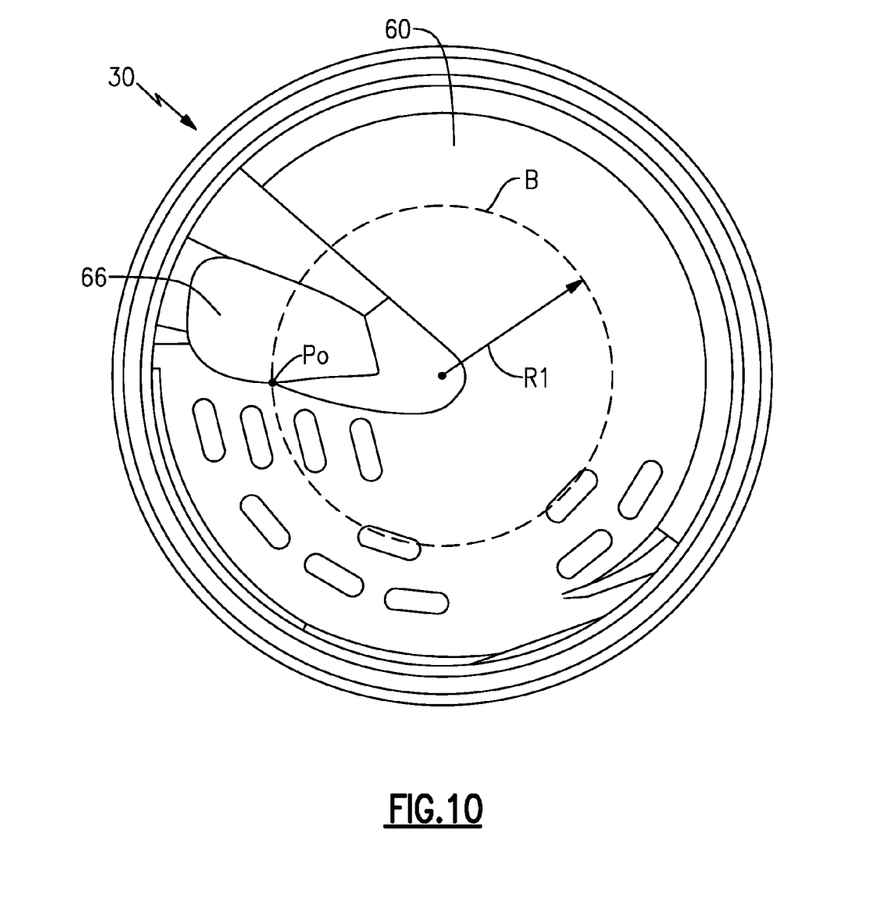
FIG. 10 shows an end view of the upstream baffle.
Figure 11:
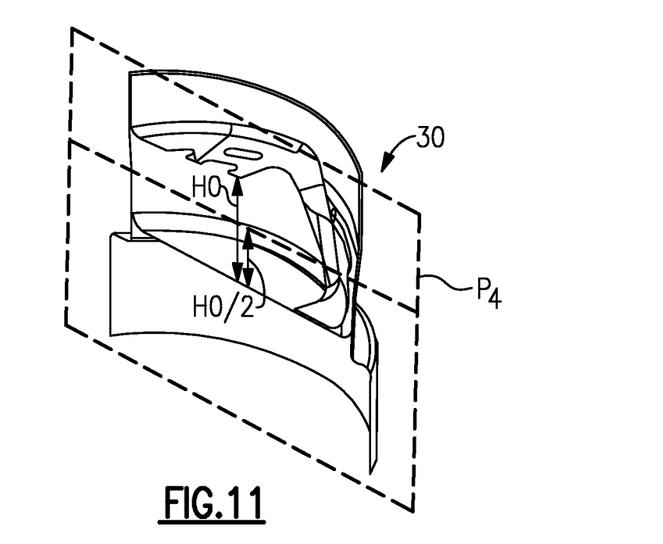
FIG. 11 shows a partial section view of the mixer defining a first plane.
Figure 12:
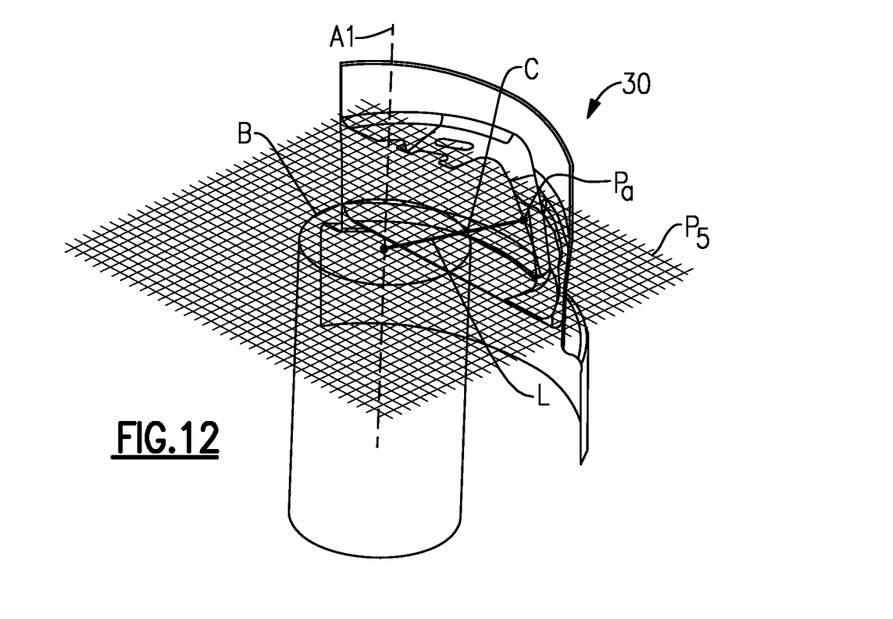
FIG. 12 shows the mixer of FIG. 12 defining a second plane.

As shown in FIG. 9, a tangential line 100 to a cylinder defined by R1 at point C defines one possible doser position 102 with line 100 being collinear with doser axis A2. This cylinder radius R1 can be varied in relation to the opening width W as follows: R2=R1−⅓ W (smaller cylinder) to R3=R1+⅓ W (larger cylinder). As described above, R1 defines a theoretical cylinder B (FIG. 10) surrounding axis A1. An intersection of this cylinder B and an edge surface of the upstream baffle defines a point Po (FIG. 10). This point Po defines a plane $P_4$ (FIG. 11) parallel to axis A1 and tangential to the cylinder B. A plane $P_5$ is defined as being perpendicular to A1 (FIG. 12) and going through the center point of Ho. The intersection between this plane $P_5$ and 92 defines a point Pa. The line starting at axis A1 and going through point Pa on the plane $P_5$ defined as shown in FIG. 12 is referred to as line L. The intersection of the cylinder B defined by radius R1 and the line L defines the point C.

Thus, the central doser axis A2 is tangentially oriented relative to a point C defined by the intersection of the line L and the cylinder surrounding A1 whose radius R1 can vary from R2 to R3. As such, point C can slide along, i.e. be varied along, line L between the radial borders R2 and R3. The doser axis A2 is tangent to point C.

In one example, the tolerance on the doser position is up to 30 degrees from its center axis. FIG. 8 shows an angular range β between 0 and 30 degrees in one plane and FIG. 9 shows an angular range α between 0 and 30 degrees in another plane.

The orientation of the doser 36 and the central doser axis A2 comprises a tangential configuration that provides advantages over the traditional radial mounting configuration. The subject tangential doser arrangement more effectively introduces the spray into the swirling engine exhaust gases to provide a more thorough mixture of exhaust gas and urea that can be introduced into the SCR catalyst. Further, the tangential orientation reduces formation of urea deposits.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A vehicle exhaust system comprising:

a mixer having an inlet end configured to receive engine exhaust gases and an outlet end configured to conduct engine exhaust gases to a downstream exhaust component, and wherein the mixer defines a center axis extending along a length of the mixer;

wherein the mixer includes an upstream baffle adjacent the inlet end and a downstream baffle adjacent the outlet end, and wherein the upstream baffle includes a plurality of openings with one opening of the plurality of openings being larger than the remaining openings such that a substantial portion of the engine exhaust gases flow through the one opening;

a doser configured to spray a reducing agent into the mixer, wherein the doser is positioned upstream of and adjacent to the one opening, and the doser defining a central doser axis that is tangentially oriented relative to a point defined at an intersection of the doser axis with a theoretical cylinder that surrounds the center axis and is defined by a variable radius; and wherein the variable radius is defined within a radius range that is defined in relation to a width of the one opening.

2. The vehicle exhaust system according to claim 1 wherein the doser is configured to spray the reducing agent in a direction away from the center of the mixer.

3. The vehicle exhaust system according to claim 2 wherein the mixer has an outer peripheral surface and an inner peripheral surface, and wherein the doser is configured to spray the reducing agent toward the inner peripheral surface.

4. The vehicle exhaust system according to claim 1 wherein the central doser axis extends in a direction generally parallel to a line tangential to an outer peripheral surface of the mixer.

5. The vehicle exhaust system according to claim 1 wherein the one opening is defined by an inner peripheral edge and an outer peripheral edge spaced radially outwardly of the inner peripheral edge, and wherein the central doser axis is closer to the outer peripheral edge than the inner peripheral edge.

6. A vehicle exhaust system comprising:

a first exhaust component having an inlet to receive engine exhaust gases;

a second exhaust component positioned downstream of the first exhaust component;

a mixer positioned downstream of the first exhaust component and upstream of the second exhaust component, the mixer having an inlet end configured to receive engine exhaust gases exiting the first exhaust component and an outlet end to direct swirling engine exhaust gas to the second exhaust component, the mixer having an upstream baffle adjacent the inlet end and a downstream baffle adjacent the downstream end, the upstream baffle including a baffle opening through which a majority of the engine exhaust gases flow into the mixer, and wherein the mixer provides a theoretical cylinder defined by a variable radius extending outwardly from a center axis of the mixer, and wherein the variable radius is defined within a radius range that is defined in relation to a width of the baffle opening; and a doser that sprays a reducing agent into the mixer, the doser being mounted to an outer peripheral surface of the mixer downstream of the baffle opening, and wherein the doser defines a central doser axis that is tangentially oriented relative to a point defined at an intersection of the doser axis with the theoretical cylinder.

7. The vehicle exhaust system according to claim 6 wherein the upstream baffle includes a plurality of openings with the baffle opening comprising one of the plurality of openings that is larger than the other openings.

8. The vehicle exhaust system according to claim 7 wherein the baffle opening is defined by an inner peripheral edge and an outer peripheral edge spaced radially outwardly of the inner peripheral edge, and wherein the central doser axis extends in a direction generally parallel to a line tangential to the outer peripheral surface of the mixer.

9. The vehicle exhaust system according to claim 7 wherein the one opening is defined by an inner peripheral edge and an outer peripheral edge spaced radially outwardly of the inner peripheral edge, and wherein the central doser axis is closer to the outer peripheral edge than the inner peripheral edge.

* * * * *